(12) United States Patent
Badger et al.

(10) Patent No.: US 6,264,173 B1
(45) Date of Patent: Jul. 24, 2001

(54) ELECTRIFIED FENCE FOR ANIMALS AND METHOD OF ENCLOSING ANIMALS

(76) Inventors: Robyn Badger, 11715 Semillon Blvd., San Diego, CA (US) 92131; Frank Stoudek, 1014 Christi Way, Fallbrook, CA (US) 92028; Spencer Tilton, 9475 Rockcrest La., Lakeside, CA (US) 92040

( * ) Notice: Subject to any disclaimer, the term of this patent is extended or adjusted under 35 U.S.C. 154(b) by 0 days.

(21) Appl. No.: 09/360,471

(22) Filed: Jul. 23, 1999

(51) Int. Cl.[7] .................................................. G08B 21/00
(52) U.S. Cl. ................................................ 256/10; 52/101
(58) Field of Search ............................... 256/10; 52/101; 174/140 R, 40 R; 119/903

(56) References Cited

U.S. PATENT DOCUMENTS

| | | |
|---|---|---|
| 2,208,881 | 7/1940 | DeLand . |
| 2,530,247 * | 11/1950 | Koonz ................................ 256/10 X |
| 2,642,683 | 6/1953 | Meyer, Jr. . |
| 2,711,037 | 6/1955 | Tallman . |
| 2,796,485 | 6/1957 | Durkee . |
| 2,885,610 | 5/1959 | Mueller . |
| 3,807,698 | 4/1974 | Enoksson . |
| 4,061,312 | 12/1977 | Walchuk . |
| 4,171,523 * | 10/1979 | Parkitny ............................. 256/10 X |
| 4,407,485 | 10/1983 | Standing . |
| 5,302,945 * | 4/1994 | Stoltenberg ....................... 256/10 X |
| 5,648,641 | 7/1997 | Guthrie . |

FOREIGN PATENT DOCUMENTS 2565780   12/1985   (FR) .

* cited by examiner

Primary Examiner—Lynne H. Browne
Assistant Examiner—John R. Cottingham
(74) Attorney, Agent, or Firm—D. Whitlow Bivens

(57) ABSTRACT

An electrified fence for animals and a method for enclosing animals in an area or excluding animals from an area. The electrified fence includes a plurality of supports inserted in the ground at a predetermined spacing. A plurality of flexible conductive members project radially from each support. The members of one support are positioned such that at least one of the free ends of the members secured to one support is in close proximity to at least one of the members secured to an adjacent support. The flexible members of each support are electrically interconnected to a source of electricity. The invention also covers a method of enclosing animals in an area or excluding animals from an area. The method includes inserting a plurality of supports into the ground at a predetermined spacing, securing a plurality of flexible conductive members to each support, positioning the members such that at least one of the free ends of the members secured to one support is in close proximity to at least one of the members secured to an adjacent support, and connecting the members to a source of electricity. The invention reduces the chances of an animal getting tangled in the fence, injuring itself and damaging the fence. In addition, the invention offers an aesthetically pleasing alternative to a conventional electric fence.

19 Claims, 2 Drawing Sheets

ELECTRIFIED FENCE FOR ANIMALS AND METHOD OF ENCLOSING ANIMALS

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION i. Field of the Invention

The present invention relates to an electric fence for animals and the method of using the same. The conventional electric fence known in the art employs one or more strands of conductive wire strung between insulating supports. One of the inherent problems with the conventional electric fence is that an animal may become tangled in the wire, injure itself and damage the electric fence. A second problem with the prior art is that the supports of a conventional fence must extend from the ground to the height at which the highest wire runs. Often these supports are bulky and somewhat unsightly. This arrangement is undesirable in a context where aesthetics are important such as an exhibit at a zoo.

ii. Description of Related Art

Guthrie U.S. Pat. No. 5,648,641 discloses an electrostatic animal barrier for electrical equipment in which a plurality of radially extending spokes extend outwardly from the perimeter of electrical bushings or other electrical equipment. Current flow within the bushing creates an electrostatic charge on the spokes sufficient to discourage an animal from attempting to climb around the barrier.

Standing U.S. Pat. No. 4,407,485 discloses wheel-like electric fence standards where an electrified fence wire passes through an insulated hub member from which radiates a number of legs to form a wheel-like configuration. A contactor within the hub automatically connects and disconnects the legs from the fence wire to prevent the legs in contact with the ground from short-circuiting the fence.

Mueller U.S. Pat. No. 2,885,610 discloses a battery powered animal shocking device. The exterior of the device consists of a conductive housing and conductive feelers. Inside the device a circuit consisting of a battery, switch and induction coil electrify the housing and feelers when the device is bumped by an animal.

Durkee U.S. Pat. No. 2,794,485 discloses an electrified drive-through gate for confining livestock. The gate is displaced from its closed position, it activates a vibrating switch that successively opens and closes a circuit which energizes the gate.

Tallman U.S. Pat. No. 2,711,037 discloses a resiliently mounted bar type gate. The gate consists of an electrified aluminum spanning element connected to a gate post by a spring.

Meyer Jr. U.S. Pat. No. 2,642,683 discloses an electrified gate. The gate consists of an inexpensive metallic rod in combination with a plurality of longitudinally spaced depending conducting elements.

None of the foregoing prior art have suggested a fence consisting of a plurality of flexible conductive members projecting radially from a support with means for connecting the flexible conductive members to a source of electricity.

SUMMARY OF THE INVENTION

The present invention reduces the chances of an animal becoming tangled in the fencing, injuring itself and damaging the fence by providing an apparatus with multiple flexible conductive members arranged in an array emanating out from a support which is adapted to be secured to the ground. The members are connected to a conventional power source of the type used in the art to provide a charge to an electric fence.

In the preferred embodiment of the invention, the support is a hollow post, preferably a PVC pipe having one end secured to the ground and the other end capped with a PVC cap. One end of each conductive member is secured to a ground bar which is bolted to the cap. The conductive members project radially in a generally upward and outward array from the ground bar. By arranging the members in such an array, the array defines a relatively large area through which an animal is deterred from passing. Of course, in some situations it may be desirable for some of the members to project horizontally or downwardly from a support.

Generally, the array will be substantially planar, however, there may be some circumstances where the members will be positioned to define any of a variety of different three dimensional shapes. This may be accomplished by bending the members themselves, varying the angle at which the members are bent relative to the ground bar, rotating a bent member with respect to the ground bar, or any combination of the aforementioned.

In the preferred embodiment, a pair of wires are connected to the ground bar and pass from the ground bar down through a pair of holes in the top of the support to connect with additional wires adapted to be connected to a source of electricity and possibly additional supports. The wires that pass through the top of the support prevent the ground bar and member array from pivoting relative to the support. Such pivoting may be caused by, among other things, animals pushing against the members or the wind exerting force on the members.

To form an elongated barrier, a plurality of the supports and member arrays may be placed and positioned such that at least one of the free ends of the members secured to one support is in close proximity to at least one of the free ends of the members secured to an adjacent support. By positioning the support and members in this manner, the space between the tips of at least some of the members attached to adjacent supports is too small for an animal to pass through without touching one or more members.

The barrier created by such an arrangement need not be straight but may be any shape so long as the tips of the members from adjacent supports are positioned as described. In this manner, the invention may be used to form a barrier around vegetation that is susceptible to damage from animals. The invention may also be used for enclosing animals in a particular area by simply arranging the support and member arrays around the entire perimeter of the area. Obviously, the invention may be combined with any number of other natural or manmade barriers such as walls, cliffs or conventional fences to either contain animals within a specified area or exclude animals from a specified area.

The present invention may also provide a barrier across a relatively small space such as a relatively small opening or passageway or to protect a plant located in a corner of an enclosure. This is accomplished by placing one support and member array such that the distance between at least some of the members' free ends and the sides of the opening, passageway, enclosure or other existing barrier is too small to allow an animal to pass by the support and member array without the animal touching one or more of the members.

When an animal touches one or more of the members it completes a circuit between the charged members and the ground. The present invention has flexible conductive members which do not physically connect one support to another. Thus, the animal may actually pass through the fence without injuring itself or damaging the fence if the animal is in a highly agitated or panicked state. If the animal is not in such a state, the animal will be deterred from passing through the fence by the electric shock it receives when it comes in contact with the members. This feature of the invention reduces the likelihood of injury to the animal and damage to the fence installation when compared with a conventional fence.

This feature has also been found to be particularly useful when fencing animals with horns or antlers, such as reindeer or antelope. Frequently, such horned or antlered animals walk with their heads down and their horns or antlers projecting out in front of the animal. It is not uncommon for such animals to entangle their horns or antlers in conventional electric fences. This may cause the animal to panic, injure itself and damage the fence. If the present invention is used instead of a conventional electric fence, the animal is much less likely to become entangled in the fence because the flexible conductive members simply give way as the animal jerks its horns or antlers.

The present invention will also give way and avoid entangling the animal if the animal is already in an excited or agitated state when it makes contact with the fence. In such a situation, a conventional fence may well result in the animal becoming injured and the fence being damaged. The present invention, however, will deter animals from passing through it by administering a shock every time the flexible members come in contact with the animal.

The present invention also overcomes the aesthetic problems associated with conventional electric fences. In the preferred embodiment, the conductive members project radially in a generally upward and outward array from the support. By arranging the members in such an array, the support takes up an area which is only a small fraction of the area defined by the members through which an animal is deterred from passing. Thus, only the antennae extend much above the ground level. This minimizes the amount of bulky support that viewers of an animal exhibit or enclosure may see. In fact, the inventions' support may be concealed with vegetation or by any other obvious means.

It has been found that when exposed to weather, the members used in the preferred embodiment corrode to a color which is virtually indistinguishable from dried vegetation such as dry grass. Thus, when incorporated into certain enclosures in a zoo or animal park, the present invention may be virtually unnoticeable. This feature is a further benefit of the invention. Alternatively, if desired the flexible members could be painted, anodized or otherwise protected against rusting.

DETAILED DESCRIPTION OF THE PREFERRED EMBODIMENT

The following description is of the best presently contemplated modes of carrying out the invention. This description is made for the purpose of illustrating the general principles of the invention and should not be taken in a limiting sense.

Figure 1:
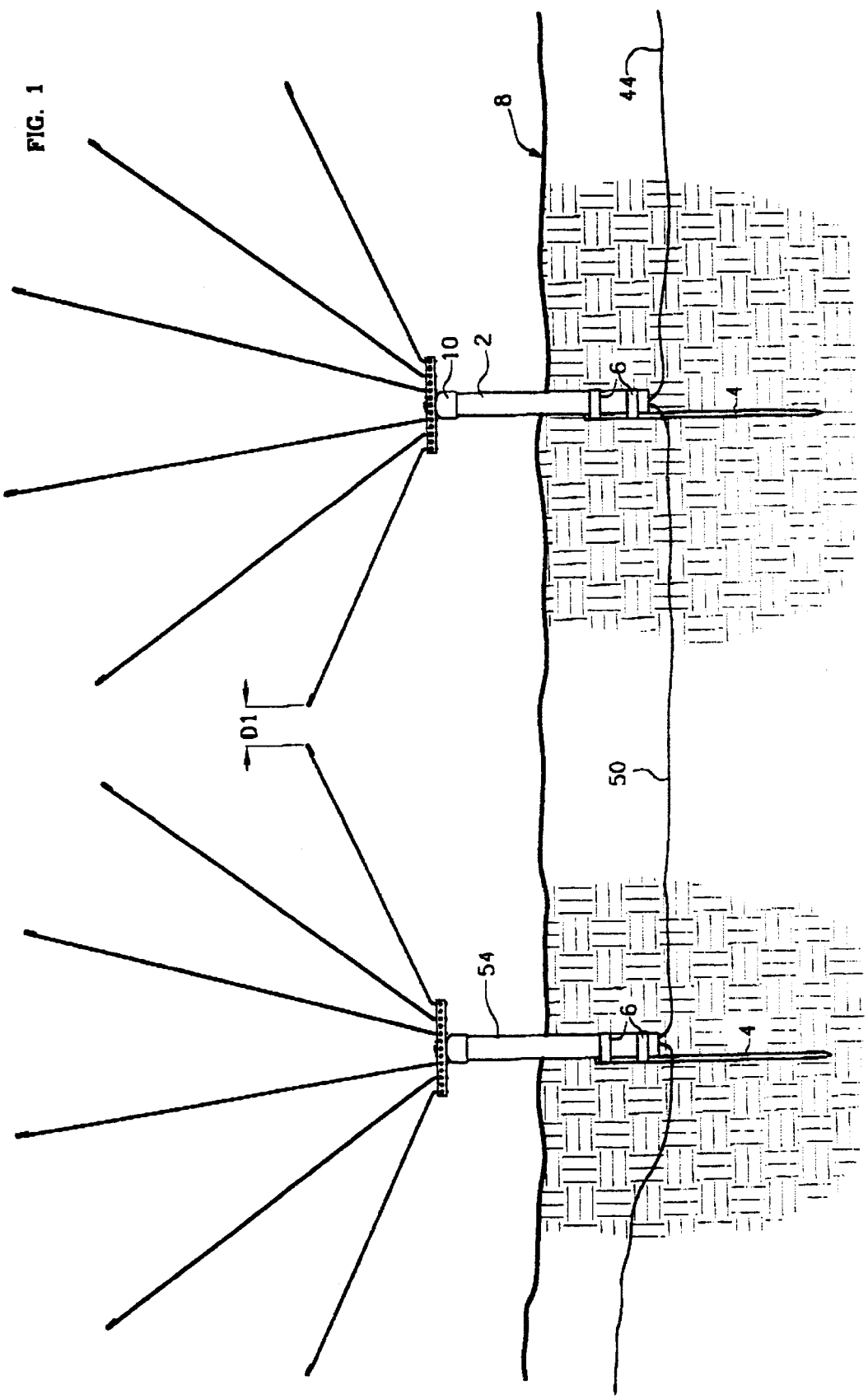
FIG. 1 is a side view of a portion of an electric fence in accordance with the principles of this invention illustrating two adjacent support and member arrays.
Figure 2:
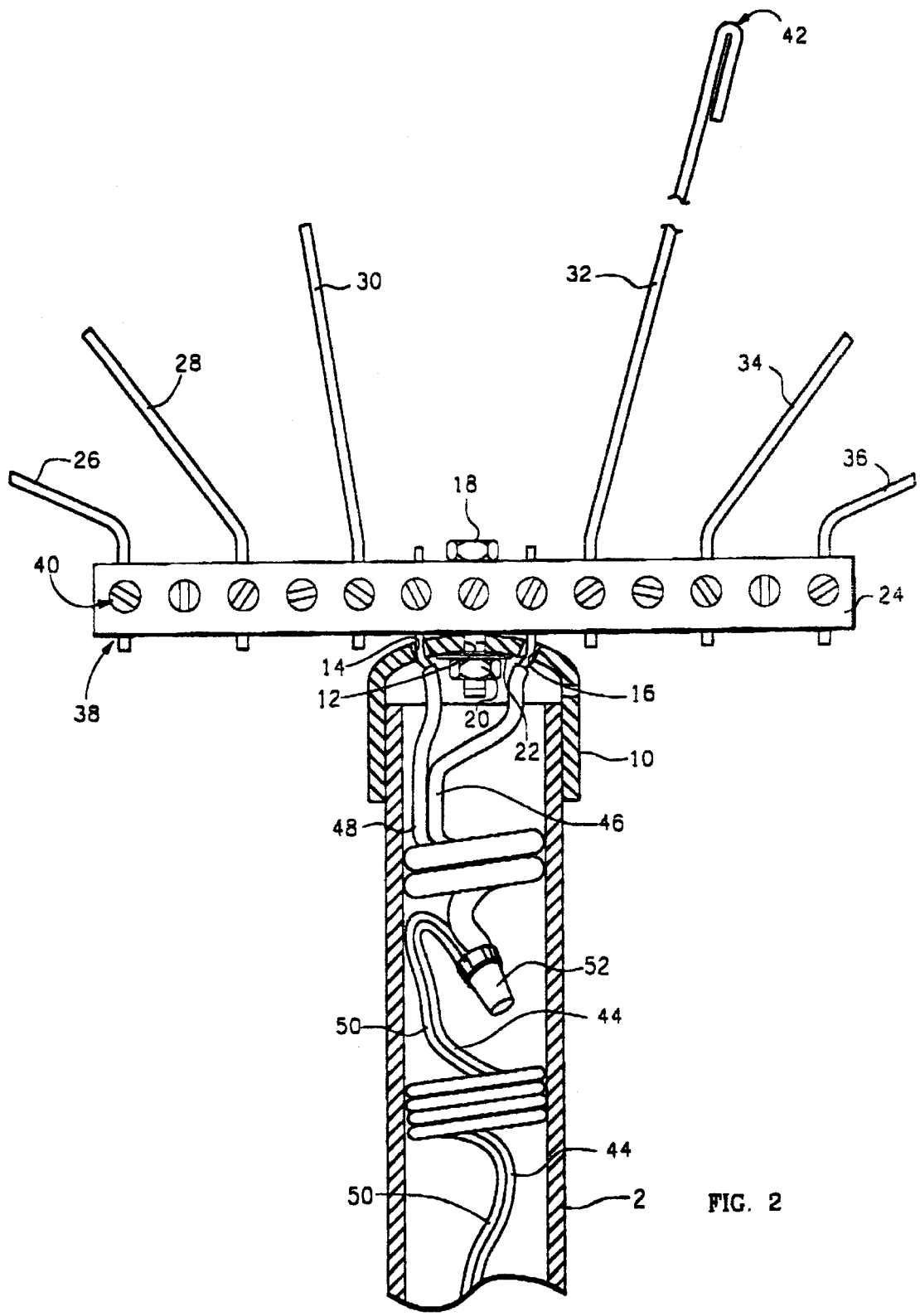
FIG. 2 is an enlarged view of a portion of a support and member array illustrating the facilities for securing the members to the support and connecting the members to wires adapted to be connected to a source of electricity.

The preferred embodiment of the invention will be described with reference to FIGS. 1 and 2. In the preferred embodiment, a support consisting of a three quarter inch PVC pipe 2 attached to a No. 4 rebar stake 4 by means of two hose clamps 6 is secured into the ground 8. The top of the PVC pipe is capped with a conventional PVC cap 10. The cap 10 has three holes 12, 14 & 16 therein. The first hole 12 accommodates a machine bolt 18 which, when combined with an appropriate nut 20 and washer 22 secures a ground bar 24. The ground bar 24 has a plurality of holes therein. One end of each of a plurality of flexible conductive members 26, 28, 30, 32, 34 & 36 is connected to the ground bar 24 by inserting it through a hole 38 and tightening a screw 40. The members 26, 28, 30, 32, 34 & 36 are bent at various angles such that the members define the space through which an animal is to be prevented from passing. The preferred material from which the members 26, 28, 30, 32, 34 & 36 are made is 11 gauge spring tempered carbon steel wire available from McMaster-Carr Supply Company. Preferably, one-half inch of the unsecured tips of the members 26, 28, 30, 32, 34 & 36 are bent back against the remainder of the members resulting in a blunt end 42.

There are six members 26, 28, 30, 32, 34 & 36 in the preferred embodiment. The pair of members 26 & 36 closest to the ground are approximately twenty four inches long, the next pair of members 28 & 34 proceeding from the ground up are approximately thirty six inches long, the length of the final pair of members 30 & 32 may vary depending on the type of animal to be fenced. In the preferred embodiment for fencing kudu, the length of the final pair of members 30 & 32 is approximately twenty four inches. In the preferred embodiment for fencing eland the length of the final pair of members 30 & 32 is approximately forty eight inches.

Each support is electrically interconnected by heavy duty cable 44 which is buried between the supports. One end of a first cable 44 is connected to a conventional power source for an electric fence (not shown). The other end of this first cable 44 passes up through the PVC pipe 2 where it is connected to three other pieces of cable 46, 48 & 50. This four wire connection is encased in an appropriate wire nut 52. The second and third cables 46 & 48 pass through the remaining two holes 14 & 16 in the PVC pipe cap 10 and are secured to the ground bar 24. The second and third cables 46 & 48 serve to connect the ground bar 24 and members 26, 28, 30, 32, 34 & 36 to the power source (not shown) and also prevent the ground bar 18 and members array from pivoting. The remaining fourth cable 50 passes back down through the PVC pipe support 2 where it continues underground to the next support 54. If there is only one support or if the support is located at the end of a series of supports, there is no fourth cable connecting to a subsequent support.

When enclosing one or more animals, there is a border around the area in which the animals are enclosed. Similarly, if animals are to be excluded from a particular area, there is a border around the area from which the animals are to be excluded.

The method of enclosing or excluding animals in accordance with the principles of this invention includes installing one or more members arrays at a predetermined spacing along the border.

To form an elongated barrier, a plurality of the supports and member arrays may be placed at a predetermined position such that the distance D1 between the tips of two members attached to adjacent supports is too small for an animal to pass through without touching one or both members. It will be appreciated that the barrier need not be straight but may be any shape so long as the tips of the members from adjacent supports are positioned as described. One example of this arrangement is shown in FIG. 1.

The present invention may also provide a barrier across a relatively small space such as a relatively small opening or passageway or to protect a plant located in a corner of an enclosure. This is accomplished by placing one support and member array such that the distance between at least some of the members' free ends and the sides of the opening, passageway, enclosure or other existing barrier is too small to allow an animal to pass by the support and member array without the animal touching one or more of the members.

Although the present invention has been described in terms of certain preferred embodiments and exemplified with respect thereto, one skilled in the art will readily appreciate that various modifications, changes, omissions and substitutions may be made without departing from the spirit and scope of the present invention. It is intended that the present invention be limited solely by the scope of the following claims:

What is claimed is:

1. An electrified fence for animals comprising:

a plurality of supports adapted to be inserted into the ground at a predetermined spacing;

a plurality of flexible conductive members projecting radially from each support;

means for securing one end of each of said members to a support and for positioning said members in an array so that at least one of the free ends of said members secured to one support is in close proximity to at least one of the free ends of the members secured to an adjacent support; and means for connecting said members to a source of electricity.

2. An electrified fence according to claim 1 wherein said members of each support define a space that is substantially planar.

3. An electrified fence according to claim 1 wherein said members are made from spring tempered steel.

4. An electrified fence according to claim 1 wherein said members are made from 11 gauge spring tempered steel.

5. An electrified fence according to claim 1 wherein said means for securing said members to a support comprises a ground bar for electrically interconnecting one end of each member secured to a support.

6. An electrified fence according to claim 5 wherein said support comprises a hollow post having a cap thereon and said ground bar is secured to said cap by a bolt.

7. An electrified fence according to claim 5 further comprising means for preventing rotation of said ground bar.

8. An electrified fence according to claim 7 wherein said support comprises a hollow post having a cap secured to the open end and said means for preventing rotation comprises a pair of wires passing through a pair of holes in said cap, each wire having two ends, one end connected to said ground bar and the other end connected to said means for connecting said members to a source of electricity.

9. An electrified fence according to claim 5 wherein said means for connecting said members to a source of electricity comprises one or more wires attached to the ground bar and connected to a source of electricity.

10. An electrified fence for keeping animals from an area comprising:

a support adapted to be inserted into the ground;

a plurality of flexible conductive members projecting radially from said support;

means for securing one end of each of said plurality of members to said support and for positioning said members in an array so that said members define a space through which an animal is to be deterred from passing; and means for connecting said members to a source of electric current.

11. An electrified fence according to claim 10 wherein said members define a space that is substantially planar.

12. An electrified fence according to claim 10 wherein said members are made from spring tempered steel.

13. An electrified fence according to claim 10 wherein said members are made from 11 gauge spring tempered steel.

14. An electrified fence according to claim 10 wherein said means for securing said members to a support comprises a ground bar for electrically interconnecting one end of each member secured to a support.

15. An electrified fence according to claim 14 wherein said support comprises a hollow post having a cap thereon and said ground bar is secured to said cap by a bolt.

16. An electrified fence according to claim 14 further comprising means for preventing rotation of said ground bar.

17. An electrified fence according to claim 16 wherein said support comprises a hollow post having a cap secured to the open end and said means for preventing rotation comprises a pair of wires passing through a pair of holes in said cap, each wire having two ends, one end connected to said ground bar and the other end connected to said means for connecting said members to a source of electricity.

18. An electrified fence according to claim 14 wherein said means for connecting said members to a source of electricity comprises one or more wires attached to the ground bar and connected to a source of electricity.

19. A method of enclosing animals in or excluding animals from an area comprising the steps of:

inserting a plurality of supports into the ground at a predetermined spacing bordering said area;

securing a plurality of flexible conductive members to each support;

positioning said members in an array so that at least some of the free ends of said members secured to one support are in close proximity to the free end of at least some of the members of an adjacent support; and connecting said members to a source of electricity.

* * * * *